United States Patent
Hama (10) Patent No.: US 10,334,123 B2
(45) Date of Patent: Jun. 25, 2019

(54) COMMUNICATION APPARATUS, CONTROL METHOD FOR COMMUNICATION APPARATUS, AND STORAGE MEDIUM

(71) Applicant: CANON KABUSHIKI KAISHA, Tokyo (JP)

(72) Inventor: Mikio Hama, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/969,195

(22) Filed: Dec. 15, 2015

(65) Prior Publication Data
US 2016/0191725 A1 Jun. 30, 2016

(30) Foreign Application Priority Data
Dec. 25, 2014 (JP) ................. 2014-262921

(51) Int. Cl.
*H04N 1/00* (2006.01)
(52) U.S. Cl.
CPC ..... *H04N 1/00214* (2013.01); *H04N 1/00244* (2013.01)
(58) Field of Classification Search
CPC ........................ H04N 1/00214; H04N 1/00244
See application file for complete search history.

(56) References Cited

U.S. PATENT DOCUMENTS

| | | | | |
|---|---|---|---|---|
| 5,105,423 A | * | 4/1992 | Tanaka | H04L 1/0002 358/412 |
| 6,801,546 B1 | * | 10/2004 | Yoshida | H04L 51/00 358/402 |
| 9,219,843 B2 | * | 12/2015 | Kudo | H04N 1/32614 |
| 9,986,109 B2 | * | 5/2018 | Kusakabe | H04N 1/00244 |
| 2002/0198947 A1 | * | 12/2002 | Sesek | G06Q 10/107 709/206 |
| 2003/0107776 A1 | * | 6/2003 | Maeda | H04L 12/5692 358/402 |
| 2003/0193696 A1 | * | 10/2003 | Walker | H04M 7/1245 358/402 |
| 2004/0051912 A1 | * | 3/2004 | Schlank | H04N 1/00204 358/468 |
| 2004/0057568 A1 | * | 3/2004 | Kawabata | H04M 1/2535 379/220.01 |
| 2006/0061821 A1 | * | 3/2006 | Maeda | H04N 1/00209 358/1.15 |
| 2008/0151318 A1 | * | 6/2008 | Shobu | H04N 1/00209 358/403 |

(Continued)

FOREIGN PATENT DOCUMENTS

JP 2015-023363 A 2/2015

*Primary Examiner* — Ted W Barnes
(74) *Attorney, Agent, or Firm* — Canon U.S.A. Inc., IP Division (57) ABSTRACT

A communication mode in an address book to be imported is replaced with a communication mode supporting an own apparatus and registered therein. A control method for controlling a communication apparatus that performs IP fax communication via an IP network, includes importing a destination of G3 fax communication, storing in a storage unit the destination imported as a destination of the IP fax communication to be performed via the IP network, and allowing a user to select a communication mode of the IP fax communication to be performed using the destination stored in the storage unit.

10 Claims, 7 Drawing Sheets

(56) References Cited

U.S. PATENT DOCUMENTS

| | | | | |
|---|---|---|---|---|
| 2008/0316543 | A1* | 12/2008 | Higuchi | H04M 11/066 358/443 |
| 2011/0043867 | A1* | 2/2011 | Tonegawa | H04N 1/4406 358/442 |
| 2011/0069356 | A1* | 3/2011 | Yoshida | H04N 1/00217 358/442 |
| 2011/0188076 | A1* | 8/2011 | Maeda | G06F 15/00 358/1.15 |
| 2012/0163572 | A1* | 6/2012 | Yanagi | H04N 1/32797 379/100.01 |
| 2012/0166881 | A1* | 6/2012 | Nakayama | H04N 1/32074 714/37 |
| 2012/0327466 | A1* | 12/2012 | Hama | H04N 1/0022 358/1.15 |
| 2013/0050755 | A1* | 2/2013 | Nakagawa | H04N 1/0022 358/1.15 |
| 2013/0050769 | A1* | 2/2013 | Hama | H04N 1/00217 358/426.08 |
| 2013/0051541 | A1* | 2/2013 | Inoue | H04M 11/066 379/100.01 |
| 2013/0148797 | A1* | 6/2013 | Toscano | H04L 51/066 379/100.08 |
| 2013/0208307 | A1* | 8/2013 | Oliszewski | H04N 1/32704 358/1.15 |
| 2014/0098406 | A1* | 4/2014 | Hama | H04N 1/0022 358/434 |
| 2014/0268219 | A1* | 9/2014 | Ho | H04N 1/00209 358/1.15 |
| 2014/0293365 | A1* | 10/2014 | Inoue | H04N 1/0022 358/442 |
| 2014/0293833 | A1* | 10/2014 | Hama | H04L 65/1069 370/259 |
| 2014/0294017 | A1* | 10/2014 | Naito | H04L 65/602 370/471 |
| 2015/0189102 | A1* | 7/2015 | Kusakabe | H04N 1/00244 358/1.15 |
| 2016/0028903 | A1* | 1/2016 | Ho | H04N 1/00209 358/426.16 |

* cited by examiner

ADDRESS BOOK
3001

| NAME | DESTINATION TELEPHONE NUMBER | COMMUNICATION MODE |
|---|---|---|
| ABC TRADING COMPANY | 0-23-4567 | ANALOG G3 |
| SALES DEPARTMENT 1 | 444-8888 | ANALOG G3 |
| XYZ CONSTRUCTION COMPANY | 0-99-1111 | ANALOG G3 |

ADDRESS BOOK
3002

| NAME | DESTINATION TELEPHONE NUMBER | COMMUNICATION MODE |
|---|---|---|
| ABC TRADING COMPANY | 0-23-4567 | ANALOG G3 |
| SALES DEPARTMENT 1 | 444-8888 | ANALOG G3 |
| XYZ CONSTRUCTION COMPANY | 0-99-1111 | ANALOG G3 |

ADDRESS BOOK
3003

| NAME | DESTINATION TELEPHONE NUMBER | COMMUNICATION MODE |
|---|---|---|
| ABC TRADING COMPANY | 23-4567 | NGN |
| SALES DEPARTMENT 1 | 444-8888 | INTRANET |
| XYZ CONSTRUCTION COMPANY | 99-1111 | NGN |

FIG. 4A

| NAME | DESTINATION TELEPHONE NUMBER |
|---|---|
| ABC TRADING COMPANY | 0-23-4567 |
| SALES DEPARTMENT 1 | 444-8888 |
| XYZ CONSTRUCTION COMPANY | 0-99-1111 |

4001 OPERATION UNIT SCREEN
4002 ADDRESS BOOK

DESTINATION SELECTION SCREEN

FIG. 4B

4001 OPERATION UNIT SCREEN

THERE IS NO COMMUNICATION MODE SUPPORTING SELECTED TELEPHONE NUMBER.
PLEASE SELECT ONE OF COMMUNICATION MODES.

[ NGN ]   [ INTRANET ]

4003

COMMUNICATION MODE SELECTION SCREEN

FIG. 4C

4001 OPERATION UNIT SCREEN

DESTINATION TELEPHONE NUMBER:
0234567 → 234567

DO YOU WANT TO DELETE PREFIX?

[ YES ]   [ NO ]

4004

PREFIX DELETION SCREEN

COMMUNICATION APPARATUS, CONTROL METHOD FOR COMMUNICATION APPARATUS, AND STORAGE MEDIUM

BACKGROUND OF THE INVENTION

Field of the Invention

The present invention relates to a communication apparatus, a control method for the communication apparatus, and a storage medium.

Description of the Related Art

Recently, there have been techniques for transmitting a facsimile (fax) to an image processing apparatus by using an Internet Protocol (IP) network. One of the techniques is deemed voice transmission using the International Telecommunications Union (ITU-T) recommendation T.30 protocol. With this technique, data is modulated into analog signals by a modulator-demodulator (MODEM), the resultant signals are coded by a voice coder-decoder (CODEC), and then an IP header is added to the coded signals to transmit them as real-time transport protocol (RTP) packets. Since T.30 analog signals are transmitted as deemed voice signals, such a transmission method is called deemed voice transmission. Moreover, since the IP network is used to provide group 3 (G3) fax communication, it is called IPG3 communication. A facsimile machine capable of performing the IPG3 communication is called an IPG3 fax machine.

The IPG3 communication can be used for fax communication between devices connected to a private IP network (an intranet). The IPG3 communication can also be used for fax communication between devices connected to a public IP network (a next generation network (NGN)).

The NGN and a conventional public switched telephone network (PSTN) line are mutually linked. This enables a telephone number of an analog G3 fax machine connected to the PSTN to be designated from an IPG3 fax machine connected to the NGN, so that a fax can be transmitted.

Alternatively, a telephone number of the IPG3 fax machine can be designated from the analog G3 fax machine to transmit a fax to the IPG3 machine. In such fax transmission, RTP packets and analog signals are mutually converted by voice over Internet protocol gateway (VoIPGW) provided inside the network by a service provider to perform communication.

Some IPG3 fax machines can be connected to two networks of the intranet and the NGN. Such an IPG3 fax machine is communicable with both of a device in the intranet line and a device in the NGN line (in an environment where the intranet and the NGN are mixed) without changing a user setting.

When a fax is transmitted from such an IPG3 fax machine, a user needs to select which communication line to be used for the fax transmission.

Accordingly, when a destination telephone number is registered to the IPG3 fax machine, the user needs to selectively register a "communication mode" indicating either of the communication lines to which the destination belongs. In such an IPG3 fax machine, selectable communication modes include "NGN" and "intranet".

Therefore, a list of such registered destination telephone numbers serves as an address book, and is stored inside the IPG3 fax machine.

With the prevalence of NGN, a shift from the analog G3 fax machine to the IPG3 fax machine is expected to increase more and more. Thus, the address book used by the conventional analog G3 fax machine is desirably transferred to the IPG3 fax machine. In the course of transfer of the address book used by the conventional analog G3 fax machine to the IPG3 fax machine, firstly, address book data is exported from the analog G3 fax machine of a transfer source and stored as a data file in a device such as a personal computer (PC) connected to a network. Herein, the data file is stored in a format such as a comma separated value (CSV).

Secondly, the IPG3 fax machine of a transfer destination imports the address book data file stored in the PC. However, since the address book of the analog G3 fax machine does not have information (a communication mode) indicating that the destination telephone number belongs to either the intranet or NGN communication line, a communication mode is set to "analog G3". Consequently, in a case where the imported destination telephone number is designated as is from the IPG3 fax machine of the transfer destination to transmit a fax, the IPG3 fax machine cannot determine whether the fax is to be transmitted to either the intranet or the NGN communication line.

Assume that the analog G3 fax machine is connected to a private branch exchange system, and an extension call and an outside call are switched using a prefix such as "0". In such a case, a destination telephone number for the "analog G3" can be an extension call and an outside call.

Consequently, in a case where the address book of the analog G3 fax machine is imported by the IPG3 fax machine, a communication mode of each of all destinations may be imported as NGN. In such a case, an outside call is connected although an extension call is called. This causes misdialing.

Moreover, in the analog G3 fax machine, the prefix such as "0" is deleted by the private branch exchange system, and a telephone number without a prefix is output to a line. In a case where a destination telephone number in the address book of the analog G3 fax machine is transferred as is to the IPG3 fax machine directly connected the NGN, a telephone number with a prefix is output to a line. This causes wrong transmission.

SUMMARY OF THE INVENTION

According to an aspect of the present invention, a communication apparatus performing IP facsimile communication via an IP network, includes an import unit configured to import a destination of G3 fax communication, a storage unit configured to store the destination imported by the import unit as a destination of the IP fax communication performed via the IP network, and a selection unit configured to allow a user to select a communication mode of the IP fax communication performed using the destination stored in the storage unit.

Further features of the present invention will become apparent from the following description of exemplary embodiments with reference to the attached drawings.

DESCRIPTION OF THE EMBODIMENTS

Exemplary embodiments according to the present invention will be described with reference to the drawings.
<System Configuration>

Figure 1:
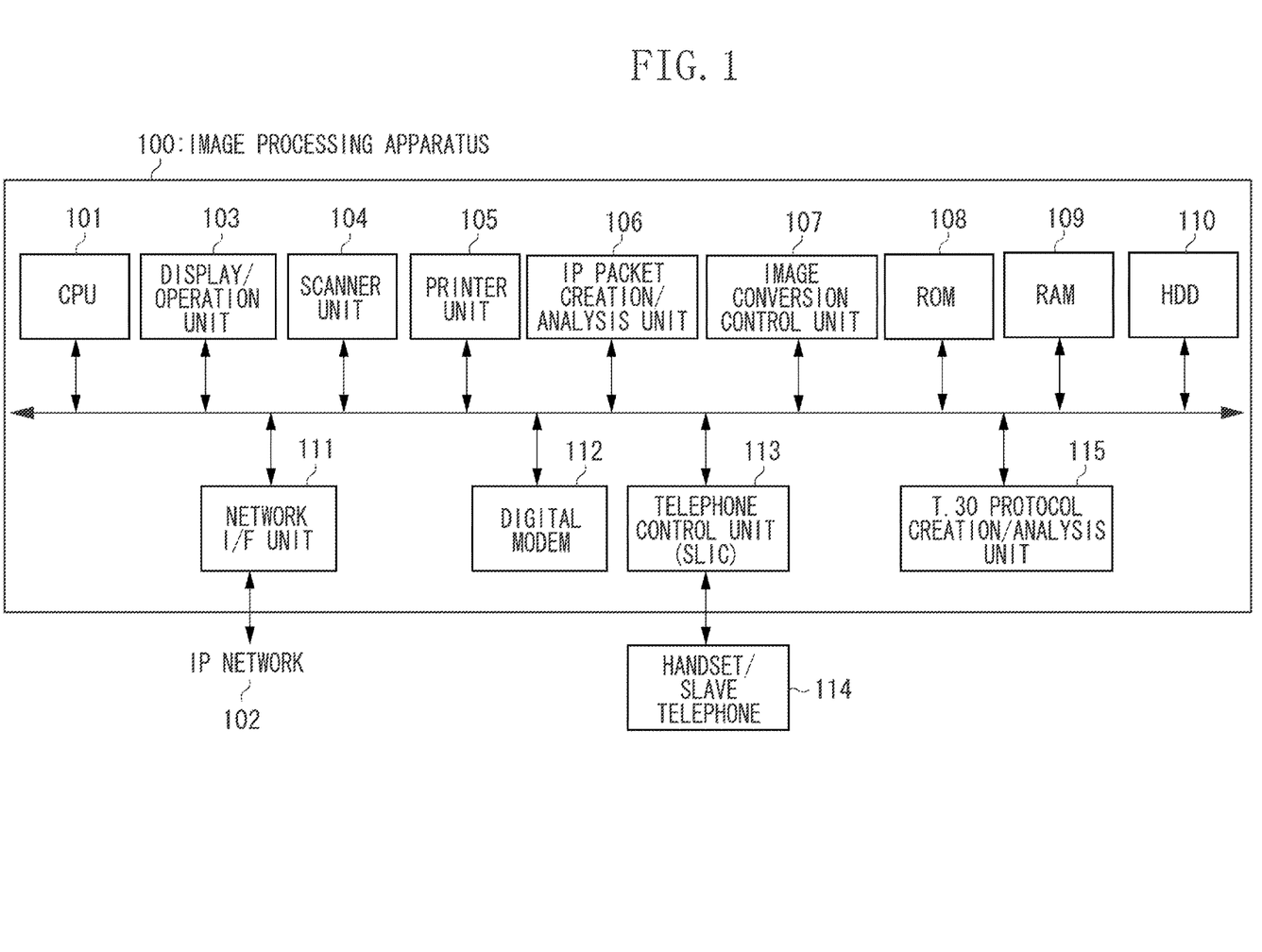
FIG. 1 is a block diagram illustrating a configuration of an image processing apparatus.

FIG. 1 is a block diagram illustrating a configuration of an image processing apparatus 100 according to a first exemplary embodiment of the present invention. The present exemplary embodiment can be applied to an information processing apparatus having a function of the image processing apparatus according to the present exemplary embodiment. For example, the information processing apparatus includes a multifunction image forming apparatus that can execute facsimile communication function processing.

In FIG. 1, a central processing unit (CPU) 101 controls each of devices in the image processing apparatus 100 based on a control program stored in a read only memory (ROM) 108 or a hard disk drive (HDD) 110. An IP network 102 is, for example, an intranet (a private IP network) and an NGN (a public IP network). A display/operation unit 103 displays, for example, a window, an icon, a message, a menu, and other user interface information on a display screen thereof.

The display/operation unit 103 includes various keys and a screen pointing device (not illustrated). The various keys are used when a user performs copy, fax, and printing operations. The screen pointing device is used when the user operates an item such as an icon and a menu on the display screen.

A scanner unit 104 reads a document, and a printer unit 105 prints print data stored in a random access memory (RAM) 109 and the HDD 110. The ROM 108 stores various control programs and data. The RAM 109 includes a work area for the CPU 101 and a loading area of a control program.

The HDD 110 stores various control programs, print data, various fax settings, and a fax address book. An IP packet creation/analysis unit 106 has a function of mapping an ITU-T Recommendation T.30 protocol to an IP packet and retrieving the ITU-T Recommendation T.30 protocol from a received IP packet. An image conversion control unit 107 compresses, decompresses, and magnifies an image to be transmitted by fax communication. In addition, the image conversion control unit 107 converts linear density of an image to be transmitted by fax communication.

A network interface controller (NIC) 111 serves as a network interface (I/F) unit. The image processing apparatus 100 is connected to an IP network via the NIC 111.

A digital MODEM 112 modulates and demodulates a fax signal. In deemed voice transmission, the digital MODEM 112 modulates a digital signal of transmission data by using a technique such as ITU-T Recommendation V. 17, and then codes the resultant signal into a coded signal conforming to G. 711 or G729 by using a voice CODEC. Further, a coded voice signal of received data needs to be decoded by the voice CODEC, and the resultant signal needs to be demodulated into a digital signal. Therefore, a digital MODEM with a voice CODEC capable of digitally inputting and outputting a signal has been proposed. The digital MODEM 112 can analyze and detect a fax signal tone such as a CED from a received voice packet.

A telephone control unit 113 is a subscriber line interface circuit (SLIC) for coding and decoding a voice signal to realize a telephone function. The telephone control unit 113 includes an analog-digital (A/D) converter, a digital-analog (D/A) converter, and a voice CODEC by which a voice signal is coded and decoded into and from a signal conforming to G. 711 or G729. A handset/slave telephone 114 is connected to the image processing apparatus 100.

Moreover, the image processing apparatus 100 includes a T.30 protocol creation/analysis unit 115 that has a function of generating facsimile transmission information according to the ITU-T Recommendation T.30 protocol, and retrieving facsimile transmission information according to a received protocol.

For example, in a case where a fax is transmitted by IPG3 fax communication in the IP network, a document image read by the scanner unit 104 is stored in the RAM 109. Then, the image is converted by the image conversion control unit 107. Subsequently, the image is modulated by the digital MODEM 112. After the modulated image is packetized into RTP packets by the IP packet creation/analysis unit 106, the RTP packets are transmitted to the IP network 102 by the NIC 111.

Figure 2:
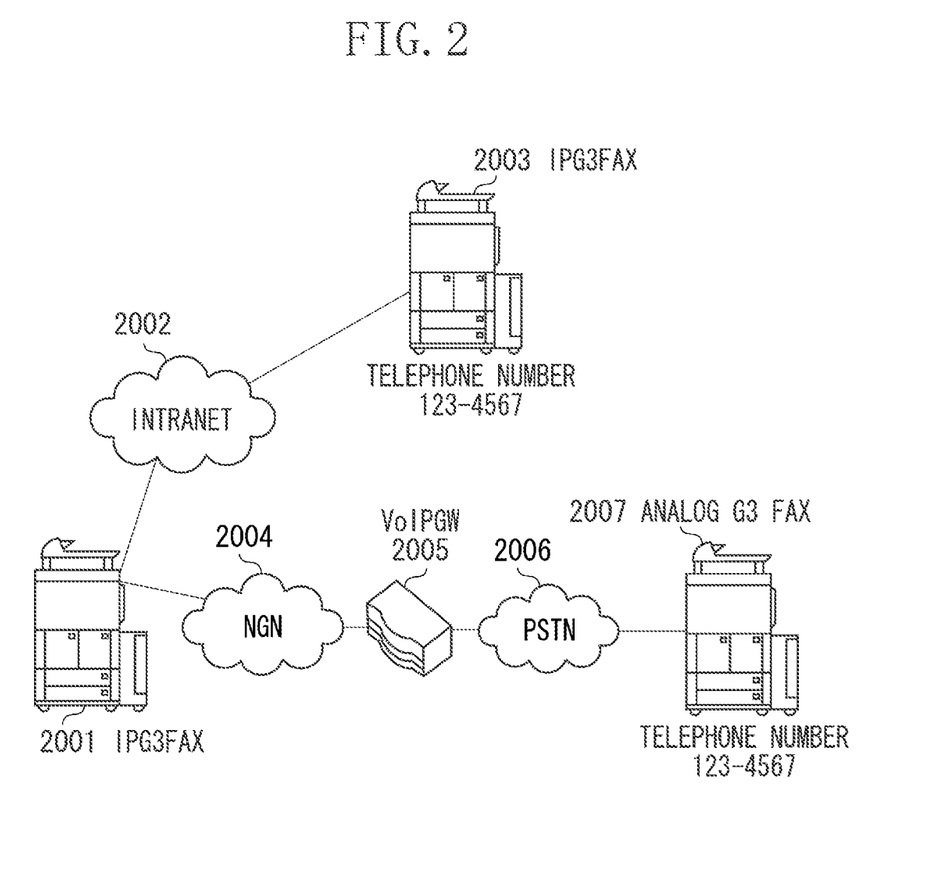
FIG. 2 is a diagram illustrating an example of an information processing system that communicates with the image processing apparatus.

FIG. 2 is a diagram illustrating an example of an information processing system that communicates with an image processing apparatus according to the present exemplary embodiment. In the system example illustrated in FIG. 2, one analog fax machine 2007 and two IPG3 fax machines 2001 and 2003 are connected via networks.

As illustrated in FIG. 2, the information processing system includes the IPG3 fax machines 2001 and 2003, an intranet 2002, an NGN 2004, a VoIPGW 2005 inside the NGN 2004, a conventional PSTN line 2006, and the conventional analog G3 fax machine 2007. The IPG3 fax machine 2003 is connected to the intranet 2002. Practically, the information processing system also includes a home gateway (HGW) serving as an adapter for NGN connection, and a server inside the intranet, but descriptions thereof are omitted.

As described above, in the NGN 2004, the VoIPGW 2005 is provided in the network by a service provider. This enables a device connected to the NGN 2004 and a device connected to the PSTN line 2006 serving as a conventional analog public network to communicate with each other.

For example, assume that a fax is transmitted from the IPG3 fax machine 2001 to a telephone number of 123-4567.

The IPG3 fax machine 2003 is connected to the intranet 2002, and has an extension number of 123-4567. The analog G3 fax machine 2007 is connected to the PSTN line 2006 serving as the analog public network, and has a local call number of 123-4567. Therefore, both of the IPG3 fax machine 2003 and the analog G3 fax machine 2007 have the destination telephone number of 123-4567. This indicates that a user needs to explicitly designate which communication mode is to be used either the intranet 2002 or the NGN 2004 to communicate with either the IPG3 fax machine 2003 or the analog G3 fax machine 2007.

If the user designates the intranet 2002 (or if a communication mode associated with the destination telephone number in an address book is the intranet 2002) and transmits a fax, the IPG3 fax machine 2001 communicates with the IPG3 fax machine 2003 connected to the intranet 2002.

If the user designates the NGN 2004 (or if a communication mode associated with the destination telephone number in an address book is the NGN 2004) and transmits a fax, the IPG3 fax machine 2001 communicates with the analog G3 fax machine 2007 connected to the PSTN line 2006.

Figure 3:
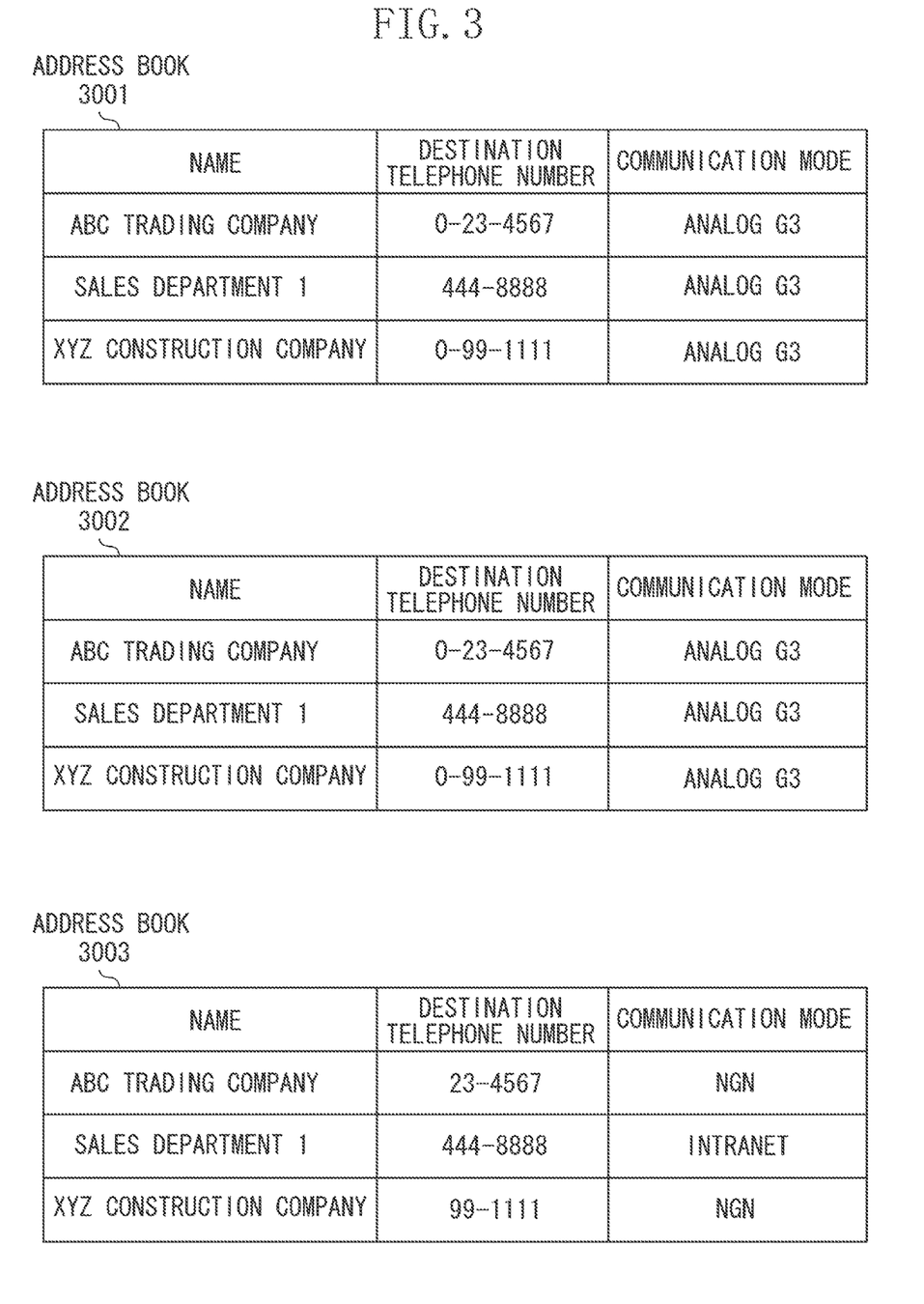
FIG. 3 is a diagram illustrating an example of an address book managed by the image processing apparatus.

FIG. 3 is a diagram illustrating an example of an address book managed by the image processing apparatus according to the present exemplary embodiment.

In FIG. 3, each of address books 3001, 3002, and 3003 includes a destination list containing "name", "destination telephone number", and "communication mode" of destinations. The address books 3001, 3002, and 3003 are stored in the respective HDDs 110.

Each of the address books 3001, 3002, and 3003 can be exported to a PC connected to a network by the NIC 111 of the G3 fax machine.

The address book 3001 is provided inside the analog G3 fax machine 2007. If the address book 3001 is exported to the PC, the address book 3001 is backed up and stored inside the PC as a data file in a format such a CSV.

When the IPG3 fax machine 2001 imports the data file corresponding to the address book 3001, contents of all items in the data file are imported without change. The address book imported to the IPG3 fax machine 2001 is, for example, the address book 3002 illustrated in FIG. 3.

Figure 4A:
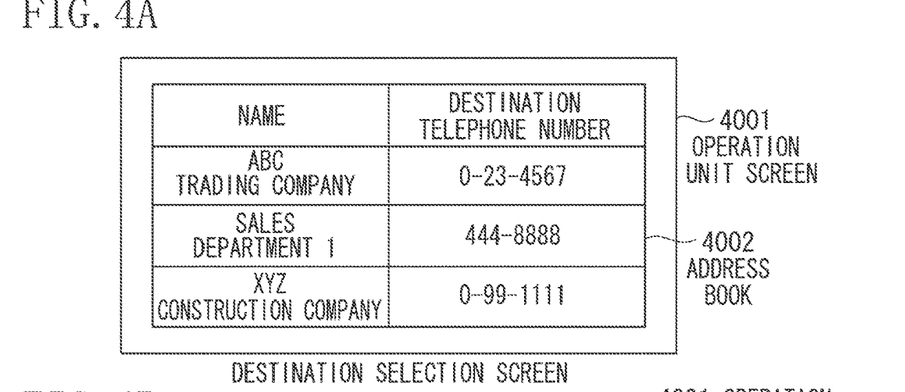
FIGS. 4A, 4B, and 4C are diagrams each illustrating an example of a user interface (UI) screen displayed on a display/operation unit.
Figure 4B:
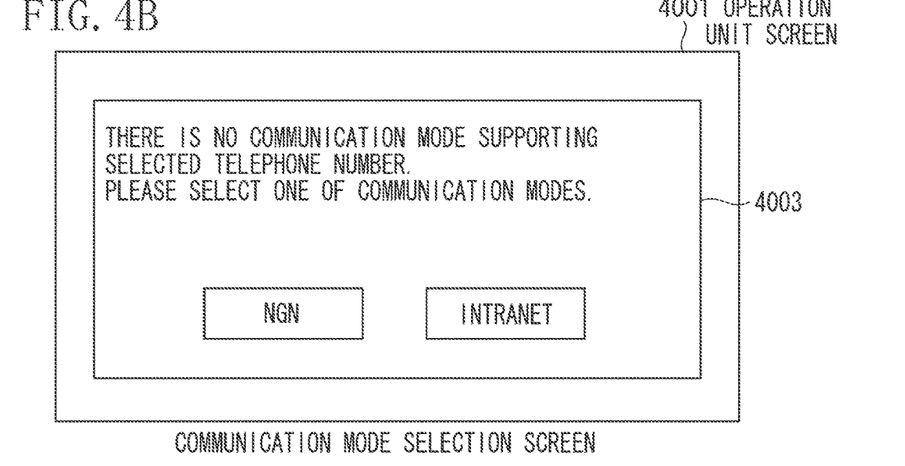
Figure 4C:
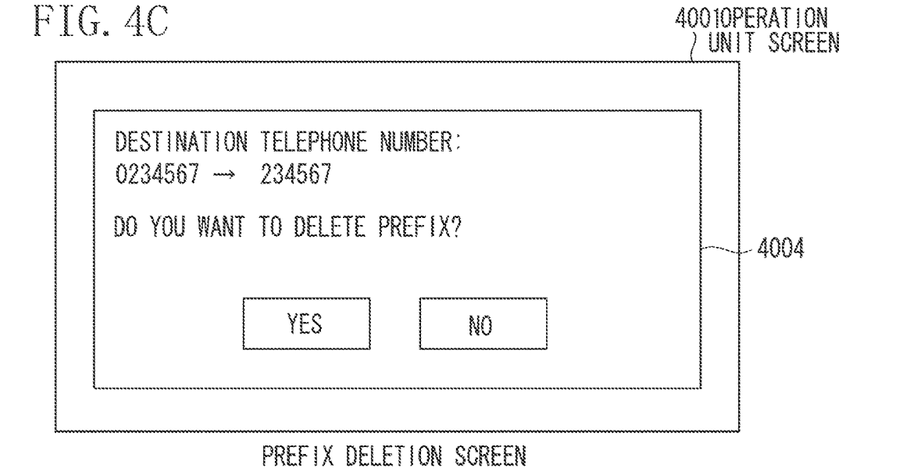
Figure 5:
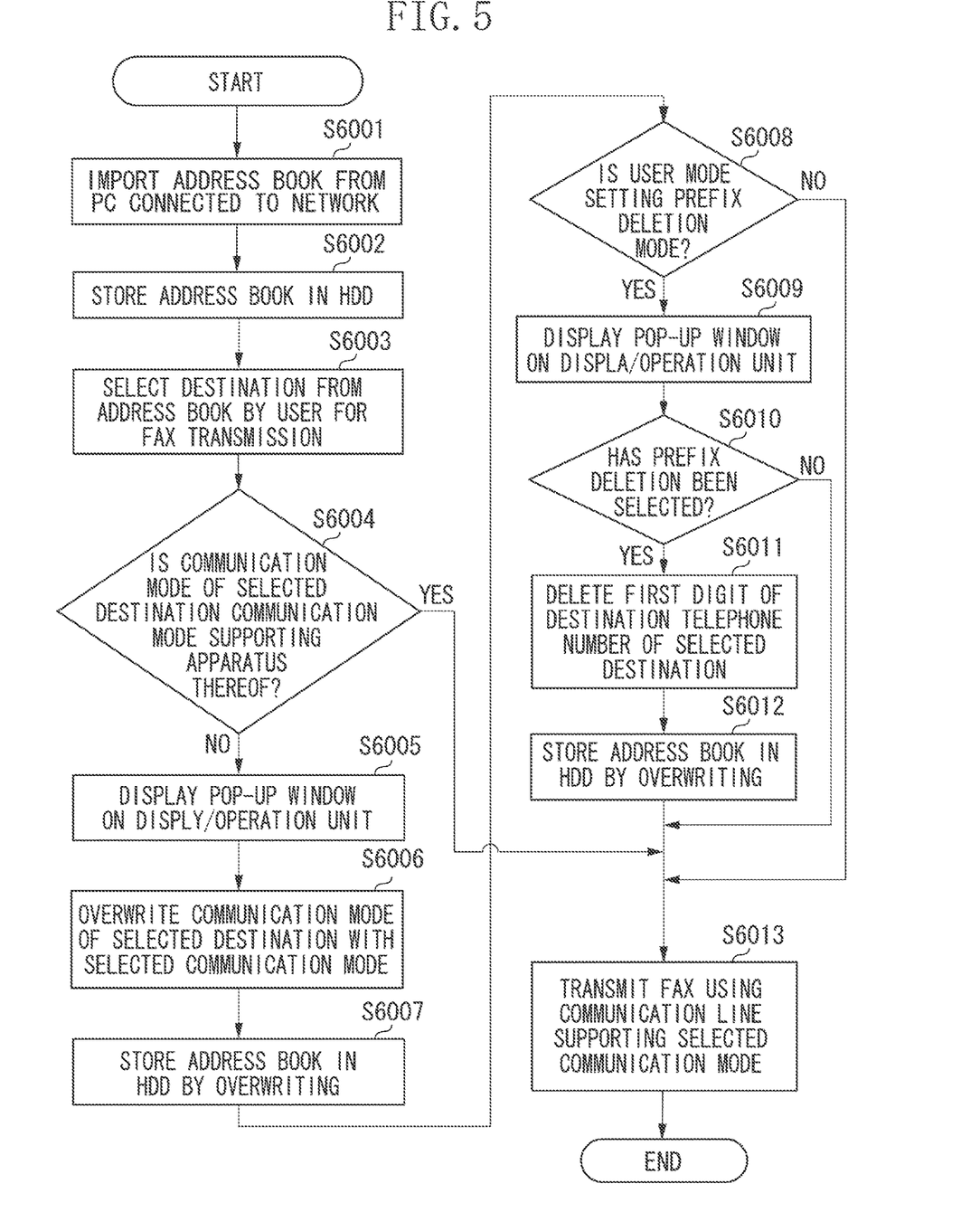
FIG. 5 is a flowchart illustrating a control method for controlling the image processing apparatus.

The address book 3003 is generated from the address book 3002 by executing the processing of the flowchart illustrated in FIG. 5. The generation of the address book 3003 is described in detail with reference to FIGS. 4A, 4B, and 4C.

FIGS. 4A, 4B, and 4C are diagrams each illustrating an example of a user interface (UI) screen displayed on the display/operation unit 103 illustrated in FIG. 1. Each of FIGS. 4A, 4B, and 4C is an example of the UI screen displayed when the IPG3 fax machine 2001 is to transmit a fax using a destination in the imported address book 3002 illustrated in FIG. 3.

FIGS. 4A, 4B, and 4c respectively illustrate a destination selection screen, a communication mode selection screen, and a prefix deletion screen.

In FIG. 4A, an address book 4002 is imported from the analog G3 fax machine 2007 as similar to the case illustrated in FIG. 3. A state of the address book 4002 is substantially the same as that of the address book 3002 illustrated in FIG. 3.

When a user selects a destination from the address book to transmit a fax, a screen display of the display/operation unit 103 is shifted to the destination selection screen displaying the address book 4002. Herein, the user selects "ABC TRADING COMPANY". A communication mode corresponding to the destination telephone number for the "ABC TRADING COMPANY" is "ANALOG G3" as illustrated in the address book 3002 of FIG. 3. Since the IPG3 fax machine 2001 does not have an analog G3 function, the screen display is shifted to the UI screen illustrated in FIG. 4B to display a pop-up window 4003. The pop-up window 4003 displays a message that there is no communication mode corresponding to the selected destination telephone number in the apparatus. Moreover, the message inquires of the user which communication mode in the apparatus is to be used for fax transmission.

Herein, the communication mode selected by the user using the communication selection UI screen illustrated in FIG. 4B displayed on the display/operation unit 103 is stored in the address book in an overwriting manner. If a user setting stored in the HDD 110 is deletion of a prefix of a destination telephone number, the user interface is shifted to the UI screen illustrated in FIG. 4C to display a pop-up window 4004 with a message. The pop-up window 4004 serves as a screen that inquires of the user whether to delete a prefix to a destination telephone number.

Then, if the CPU 101 determines that the user has operated the display/operation unit 103 and agreed to the contents of the pop-up window 4004 (if the user presses "YES"), the prefix of the telephone number is deleted and the address book is overwritten. In the present exemplary embodiment, a first digit of the prefix is deleted. However, the user may be allowed to set the number of leading digits to be deleted. Accordingly, the address book of the IPG3 fax machine 2001 is registered and managed in the HDD 110 as the address book 3003 illustrated in FIG. 3.

FIG. 5 is a flowchart of a control method for the image processing apparatus according to the present exemplary embodiment. The flowchart of FIG. 5 illustrates an example of processing by which an address book is imported and a communication mode in the address book is replaced with a communication mode selected by a user. Each step of the flowchart is performed by the CPU 101 executing a control program stored in a storage unit such as the HDD 110.

In step S6001, the IPG3 fax machine 2001 imports a data file corresponding to the address book 3001 from a PC connected to a network.

In step S6002, the CPU 101 stores the address book 3001 in the HDD 110. At that time, items in the address book 3001 are not changed.

In step S6003, the user selects a destination from the address book 4002 for fax transmission.

In step S6004, the CPU 101 determines whether a communication mode of the selected destination is a communication mode corresponding to the IPG3 fax machine 2001. If the CPU 101 determines that the communication mode of the selected destination is a communication mode, such as "analog G3" that does not support the IPG3 fax machine 2001 (NO in step S6004), the processing proceeds to step S6005. If the CPU 101 determines that the communication mode of the selected destination is a communication mode supporting the IPG3 fax machine 2001, for example, "NGN3" and "intranet" (YES in step S6004), the processing proceeds to step S6013.

In step S6005, the CPU 101 displays the pop-up window 4003 on the display/operation unit 103 to cause the user to select a communication mode supporting the IPG3 fax machine 2001 for replacement of the communication mode that does not support the IPG3 fax machine 2001. In step S6006, the CPU 101 overwrites a communication mode of the destination selected in step S6003 with the communication mode selected in step S6005.

In step S6007, the CPU 101 writes the address book, the communication mode of which is replaced in step S6006, into the HDD 110.

In step S6008, the CPU 101 reads a user setting stored in the HDD 110 to determine whether deletion of a prefix of a destination telephone number has been set. If the CPU 101 determines that the prefix deletion has been set (YES in step S6008), the processing proceeds to step S6009. On the other hand, if the CPU 101 determines that the prefix deletion has not been set (NO in step S6008), the processing proceeds to step S6013.

In step S6009, the CPU 101 displays the pop-up window 4004 on the display/operation unit 103 to allow the user to select whether to delete the prefix to the destination telephone number.

In step S6010, the CPU 101 determines whether the prefix deletion has been selected. If the CPU 101 determines that the prefix deletion has been selected (YES in step S6010), the processing proceeds to step S6011. If the CPU 101 determines that the prefix deletion has not been selected (NO in step S6010), the processing proceeds to step S6013. In this case, a fax is transmitted to the telephone number just as it is.

In step S6011, the CPU 101 deletes a first digit of the destination telephone number as the selected destination information. In step S6012, the CPU 101 writes the address book, the destination telephone number of which is rewritten in step S6011, into the HDD 110.

In step S6013, a fax is transmitted by the IPG3 communication using the communication mode corresponding to the communication mode selected in step S6003 and step S6005.

In the first exemplary embodiment, a the example processing has been described in which an address book is imported and a communication mode in the address book is replaced with a communication mode selected by a user. However, such processing needs to be executed with respect to each name registered in the address book 3002, causing an increase in a workload of the user.

Accordingly, in a second exemplary embodiment, a description is given of an example in which a more convenient function is provided by automatically changing a communication mode.

Figure 6:
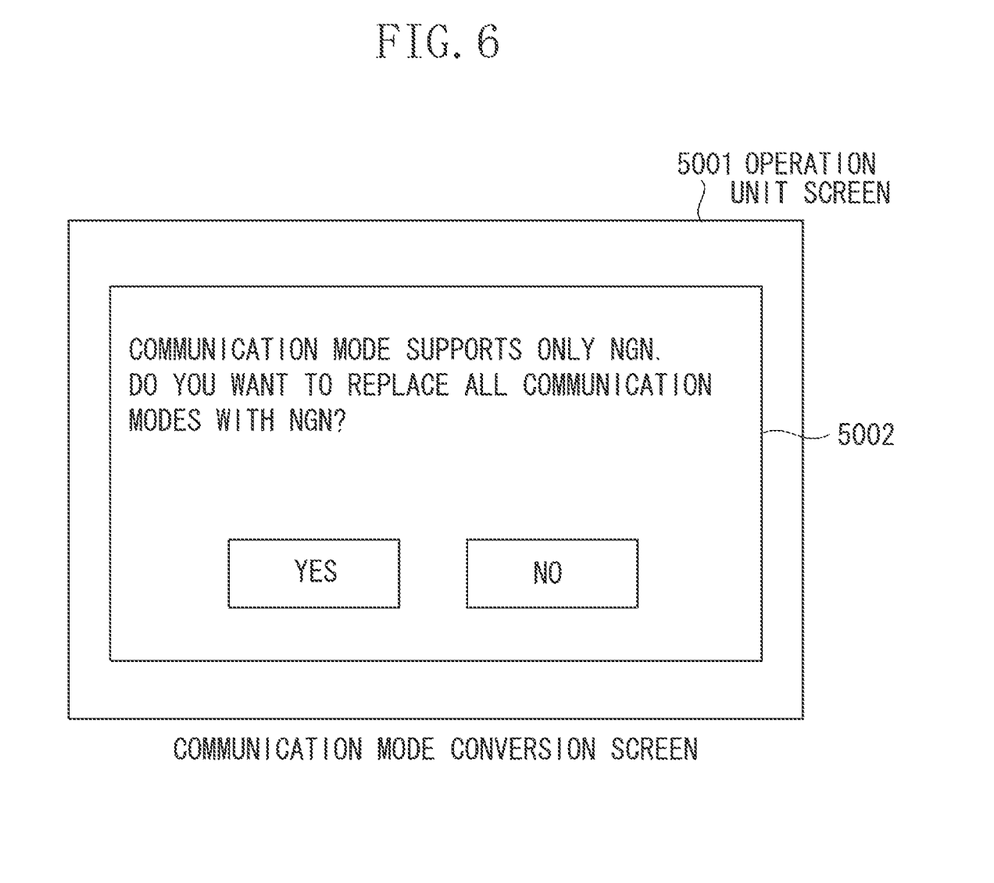
FIG. 6 is a diagram illustrating an example of a UI screen displayed on the display/operation unit.

FIG. 6 is a diagram illustrating an example of a UI screen displayed on a display/operation unit 103 illustrated in FIG. 1. The present exemplary embodiment is an example of a UI screen for a communication mode collective conversion function as an example of a function of automatically converting communication modes of an address book when the address book is imported.

In FIG. 6, in an IPG3 fax machine 2001, it is possible to validate only one of the communication modes (i.e., NGN and intranet) according to a setting. Communication modes other than the valid communication mode cannot be connected. This setting is stored in the HDD 110 as non-volatile information, and the user can change the setting via the display/operation unit 103. For example, assume that the IPG3 fax machine 2001 is connected to only the NGN and has a setting with which only the NGN is used. In such a case, when an address book 3001 of an analog G3 fax machine 2007 is imported, all of destinations with an "analog G3" communication mode may be changed to the destinations with an "NGN" communication mode. Such a change can reduce a workload of the user. In this case, the CPU 101 displays a message and a pop-up window 5002 on the display/operation unit 103 to inquire of the user whether to change all of the communication modes to the NGN. The pop-up window 5002 is displayed when an address book of the analog G3 fax machine 2007 is imported to an address book of the IPG3 fax machine 2001.

Figure 7:
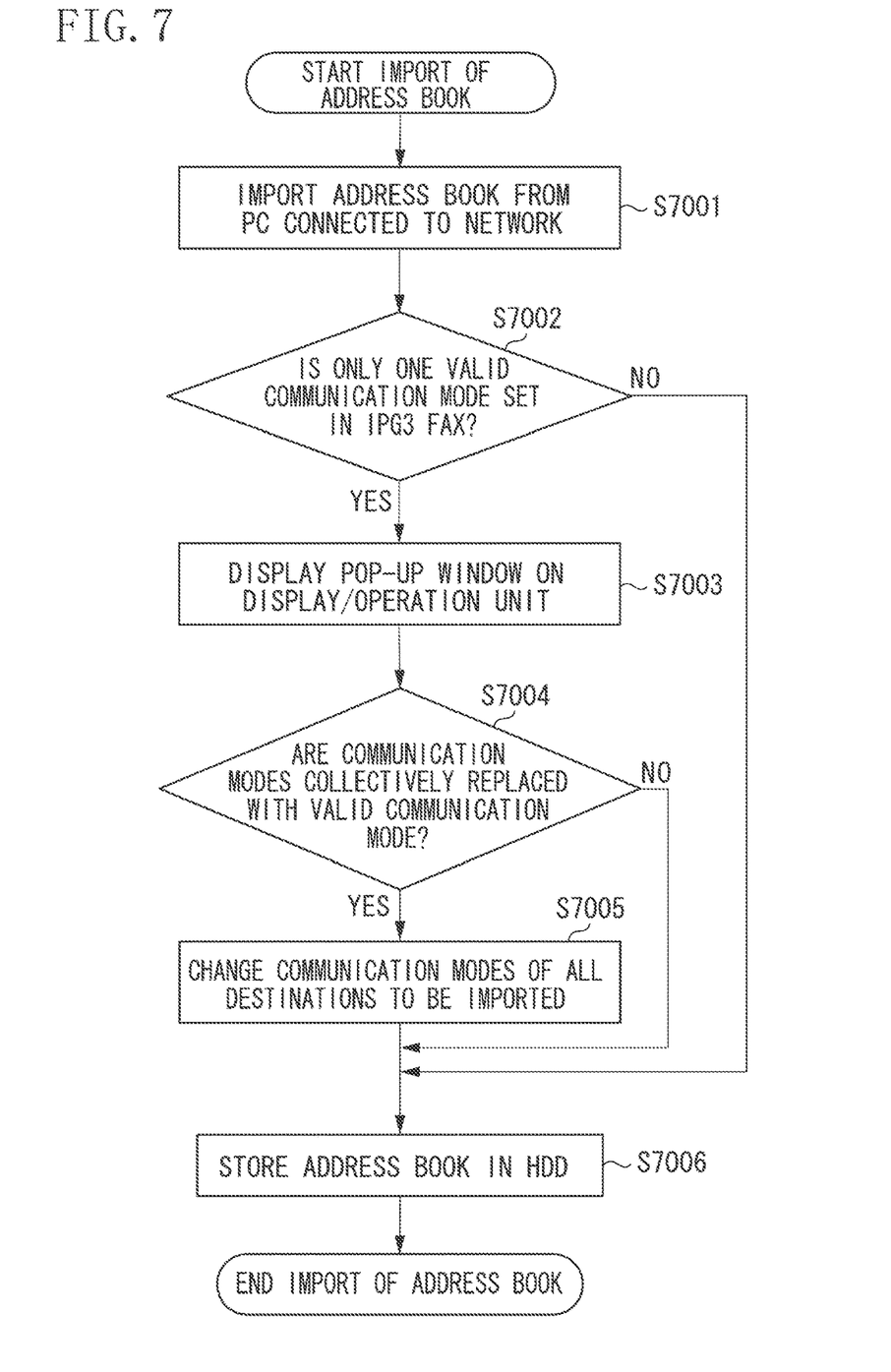
FIG. 7 is a flowchart illustrating a control method for controlling the image processing apparatus.

FIG. 7 is a flowchart illustrating a control method for an image processing apparatus according to the present exemplary embodiment. The flowchart illustrated in FIG. 7 illustrates an example of processing in which the address book 3001 of the analog G3 fax machine 2007 is imported and communication modes in the address book are collectively converted into a specific communication mode for the IPG3 fax machine 2001. Each step of the flowchart is performed by a CPU 101 executing a control program stored in a storage unit such as an HDD 110.

In step S7001, a user imports a data file corresponding to the address book 3001 from, for example, a PC connected to a network. In step S7002, the CPU 101 determines, based on a user setting stored in the HDD 110, whether only one valid communication mode is set in the IPG3 fax machine 2001. If the CPU 101 determines that there is only one valid communication mode (YES in step S7002), the processing proceeds to step S7003. If the CPU 101 determines that a plurality of communication modes are valid (NO in step S7002), the processing proceeds to step S7006.

In step S7003, the CPU 101 displays the pop-up window 5002 on the display/operation unit 103 to inquire of the user whether to convert communication modes of all destinations in the address book to be imported into the valid communication mode acquired in step S7002.

In step S7004, the CPU 101 determines whether the user has selected "YES". If the CPU 101 determines that the user has selected "YES" (YES in step S7004), the processing proceeds to step S7005. If the CPU 101 determines that the user has selected "NO" (NO in step S7004), the processing proceeds to step S7006. In step S7005, the CPU 101 converts the communication modes of all destinations in the address book to be imported into the valid communication mode (NGN) acquired in step S7002. In step S7006, the CPU 101 writes the address book into the HDD 110.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-262921, filed Dec. 25, 2014, which is hereby incorporated by reference herein in its entirety.

What is claimed is:

1. A communication apparatus which is able to perform IP fax communication in accordance with an IP fax communication mode via an IP network, the communication apparatus comprising:
a controller configured to import, from an external apparatus, a destination and a fax communication mode corresponding to the destination; and
a non-volatile storage configured to store the imported destination and the imported fax communication mode,
wherein the controller determines whether the imported fax communication mode is a G3 fax communication mode or the IP fax communication mode,
wherein the controller controls a display to display a message for urging a user to change the G3 fax communication mode in a case where the controller determines that the imported fax communication mode is the G3 fax communication mode, and wherein the message is not displayed in a case where the controller determines that the imported fax communication mode is the IP fax communication mode.

2. The communication apparatus according to claim 1, wherein the non-volatile storage stores the imported fax communication mode in association with the imported destination.

3. The communication apparatus according to claim 1, wherein the controller deletes a prefix from the imported destination, and
wherein the non-volatile storage stores the imported destination from which the prefix is deleted by the controller.

4. The communication apparatus according to claim 3, further comprising a user interface configured to set whether to delete the prefix from the imported destination,
wherein, if deletion of the prefix from the imported destination is set by the user interface, the controller deletes the prefix from the imported destination.

5. The communication apparatus according to claim 1, further comprising:
a user interface configured to designate a destination stored in the non-volatile storage; and
a network interface configured to transmit image data to the destination designated by the user interface.

6. The communication apparatus according to claim 1, wherein the communication mode includes an intranet.

7. The communication apparatus according to claim 1, further comprising:
a user interface configured to select the destination from among imported destinations,
wherein the controller controls the display to display the message in a case where the destination is selected by the user interface and the controller determines that the imported fax communication mode of the destination selected by the user is the G3 fax communication mode.

8. The communication apparatus according to claim 1, wherein the controller further controls the display to display, in a case where the controller determines that the imported fax communication mode is the G3 fax communication mode, a first object for changing the fax communication mode to a first type of the IP fax communication mode and a second object for changing the fax communication mode to a second type of the IP fax communication mode.

9. A control method for controlling a communication apparatus that is able to perform IP fax communication in accordance with an IP fax communication mode via an IP network, the control method comprising:
importing, by a controller, from an external apparatus, a destination and a fax communication mode corresponding to the destination;
storing, in a non-volatile storage, the imported destination and the imported fax communication mode;
determining whether the imported fax communication mode is a G3 fax communication mode or the IP fax communication mode;
controlling a display to display a message for urging a user to change the G3 fax communication mode in a case where the controller determines that the imported fax communication mode is the G3 fax communication mode, and
wherein the message is not displayed in a case where the controller determines that the imported fax communication mode is the IP fax communication mode.

10. A non-transitory computer-readable storage medium storing a program for causing a computer to execute a control method for a communication apparatus that is able to perform IP fax communication in accordance with an IP fax communication mode via an IP network, the control method comprising:
importing, by the computer, from an external apparatus, a destination and a fax communication mode corresponding to the destination;
storing, in a non-volatile storage, the imported destination and the imported fax communication mode;
determining whether the imported fax communication mode is a G3 fax communication mode or the IP fax communication mode;
controlling a display to display a message for urging a user to change the G3 fax communication mode in a case where the controller determines that the imported fax communication mode is the G3 fax communication mode, and
wherein the message is not displayed in a case where the controller determines that the imported fax communication mode is the IP fax communication mode.

* * * * *